US005817434A

United States Patent [19]
Brooker et al.

[11] Patent Number: 5,817,434
[45] Date of Patent: Oct. 6, 1998

[54] HIGH TEMPERATURE STORAGE BATTERY

[75] Inventors: Stephen D. Brooker, Derby; Roger N. Bull, Ashbourne, both of England

[73] Assignee: Electro Chemical Holdings Societe Anonyme, Luxembourg

[21] Appl. No.: 698,680

[22] Filed: Aug. 16, 1996

[30] Foreign Application Priority Data

Aug. 17, 1995 [GB] United Kingdom ............... 9516850

[51] Int. Cl.⁶ ..................................................... H01M 2/36
[52] U.S. Cl. .............................. 429/49; 429/95; 429/104
[58] Field of Search ................. 429/49, 95, 104, 429/159

[56] References Cited

U.S. PATENT DOCUMENTS

| | | | |
|---|---|---|---|
| 4,446,213 | 5/1984 | Steinleitner | 429/104 |
| 4,656,102 | 4/1987 | Hasenauer et al. | 429/104 |
| 5,158,841 | 10/1992 | Mennicke et al. | 429/120 |
| 5,272,019 | 12/1993 | Flory et al. | 429/104 |

FOREIGN PATENT DOCUMENTS

| | | |
|---|---|---|
| 1316211 | 4/1993 | Canada . |
| 0 116 960 | 8/1984 | European Pat. Off. . |
| 32 48 110 | 6/1984 | Germany . |
| 2 086 645 | 5/1982 | United Kingdom . |

OTHER PUBLICATIONS

International Search Report dated Oct. 16, 1996.

*Primary Examiner*—Stephen Kalafut
*Attorney, Agent, or Firm*—Arnold, White & Durkee

[57] ABSTRACT

A high temperature storage battery comprises a battery housing defining a cell storage cavity, and a plurality of non-aqueous high temperature electrochemical cells within the storage cavity. A base is provided below the cells, and there is a reservoir for released cell reactants in or below the base. At least one access opening through which reactants which are accidentally released from the cells can enter the reservoir, is provided.

14 Claims, 3 Drawing Sheets

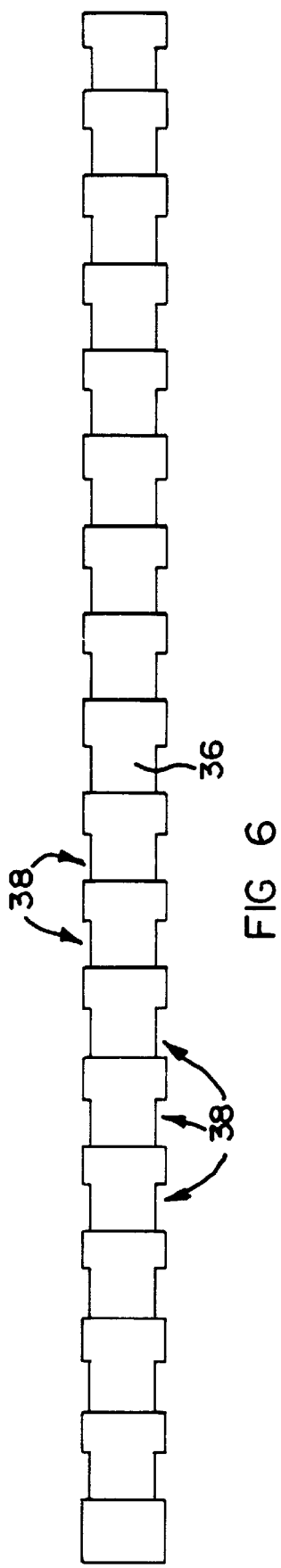

HIGH TEMPERATURE STORAGE BATTERY

This application claims priority to British Provisional Application No. 9516850.6 filed on Aug. 17, 1995 in the name of PROGRAMME 3 PATENT HOLDINGS.

FIELD OF THE INVENTION

This Invention relates to a high temperature storage battery.

SUMMARY OF THE INVENTION

According to the invention, there is provided a high temperature storage battery, which comprises a battery housing defining a cell storage cavity;

a plurality of non-aqueous high temperature electrochemical cells within the storage cavity;

a base below the cells; and a reservoir for released cell reactants in or below the base, with at least one access opening in the base through which reactants which are accidentally released from the cells can enter the reservoir.

While the battery housing can, at least in principle, be of any desired shape or construction, it will normally be square or rectangular in plan view, and be of laminar construction. It may thus include an inner battery box providing the cell storage cavity, and comprising a floor panel, a pair of end panels and a pair of side panels, the end and side panels arranged peripherally around the floor panel and protruding upwardly therefrom; and a plurality of layers over and around the inner battery box and sealing off the inner battery box, these layers defining an outer battery box within which the inner battery box is located, with the outer battery box thus having complementary floor, side and end panels and also having a top panel closing off the upper end of the inner battery box. The outer battery box will then also have components normally associated with a battery of this kind, such as battery terminals. The floor, top and/or wall panels of the inner and/or the outer battery boxes will be of double-walled construction with heat insulating material provided between the panel walls. Instead, or additionally, such heat insulating material can be provided between the panels of the inner and outer battery boxes.

The base may be integral with the inner battery box floor panel, with the reservoir being provided in the inner battery box floor panel. Instead, however, the inner battery box floor panel may be spaced from the base, with the base also being in the form of a panel, so that the reservoir is provided between the floor panel and the base panel.

In particular, the inner battery box may include a base plate on which the cells are located, with the base plate being spaced from the inner battery box floor panel so that a cooling fluid space is provided between the base plate and the inner battery box floor panel, with the base plate and inner battery box floor panel thus constituting the base below the cells and the cooling fluid space constituting the reservoir for released cell reactants, and with the access opening(s) thus being provided in the base plate.

The cells may be arranged in a plurality of rows, with a plurality of the reservoirs, in the form of channels, being provided between the base plate and the inner battery box floor panel. The channels may run along the rows, and adjacent channels may be isolated from each other. A plurality of the access openings may be provided in the base plate along each channel. At least one access opening may be provided below each cell. If desired, absorbent material for released cell reactants, may be located in the channels. This material may also be capable of reacting, eg to neutralize, any released reactants which enter the channels.

In one embodiment of the invention, the cells may be of the molten alkali metal/chalcogen type comprising, in essence, the molten alkali metal electrode, with the other electrode being, or comprising, a chalcogen, and with a solid electrolyte separating the electrodes. The molten alkali metal is typically sodium, the chalcogen sulphur or a polysulphide, and the solid electrolyte $\beta$-alumina. Such a cell has an operating temperature in the region of 300° C.–400° C.

In another embodiment of the invention, the electrochemical cell may be of a kind comprising the molten alkali metal electrode or anode; with the other electrode or cathode comprising an alkali metal aluminum halide molten salt electrolyte, an electronically conductive electrolyte-permeable matrix impregnated with the electrolyte, and a transition metal chloride dispersed in the matrix. Typically, the alkali metal is sodium, the electrolyte sodium aluminum chloride ($NaAlCl_4$), the transition metal iron or nickel, and the separator $\beta$ or $\beta"$-alumina. The operating temperature of such a cell is in the region of 250° C.–400° C.

The cells may be arranged in groups or modules, with spaces or gaps being provided between adjacent cells and/or between adjacent groups or modules of cells. In addition to the lower cooling fluid space between the base plate and the inner battery box floor panel, an upper cooling fluid space may be provided above the cells.

The battery may then include cooling fluid feed means comprising an inlet manifold in communication with the lower cooling fluid space below the cells and a cooling fluid inlet leading into the inlet manifold; and spent cooling fluid withdrawal means comprising an outlet manifold in communication with the upper cooling fluid space above the cells and a cooling fluid outlet leading from the outlet manifold. The spaces or gaps between the cells or groups of cells interconnect the upper and lower spaces and permit cooling fluid movement from the lower to the upper space, in use. The cooling fluid may, in-particular, be air.

Electrical insulation material may be provided between at least some adjacent cells. In particular, the electrical insulation material may be provided between at least some of the adjacent cells in each of the rows. The insulation material may protrude above the upper ends of cell casings of the cells, to restrict movement of released cell reactants in the event of cell failure. The electrical insulation material may be mica.

Electrically insulating and/or battery box supporting partitions may be provided between adjacent rows of cells. Each partition may be of laminar construction, and may comprise an inner layer of material sandwiched between outer layers of material. The material of the inner layer of the partitions may be stainless steel, nickel, ceramic, glass or other similar material capable of providing strength and rigidity to the partition, while the material of the outer layers may be electrically insulative, eg mica. The partitions may also extend to above the upper ends of the cell casings and/or may protrude below the base plate, so that the partitions also serve to restrict movement of released cell reactants across the pack of cells in the cavity.

Each cell will naturally have a current collector and a terminal for each electrode. In particular, each cell may have a casing or housing in the form of a canister having a floor and at least one side wall, and an open end opposite the floor, the open end being closed off by a closure, and the closure having a periphery connected to the housing at said open end, with the cell having a pair of electrodes respectively provided, at the open end of the housing, with electrode terminals, one of said terminals being an outer terminal electronically connected to the housing at the periphery of the closure, and the housing forming a current collector for one of the electrodes. The other of the terminals is then a central terminal electronically connected to a separate current collector for the other electrode, which separate current collector protrudes longitudinally inwardly from the cell closure, radially inwardly of the periphery of the closure, and being electronically insulated from the housing. The outer terminal may project laterally outwardly from the periphery of the housing to overhang, at a position spaced longitudinally outwardly from the closure, a side wall of the housing. The terminals are then arranged so that the cell can be arranged side-by-side with an identical cell with its outer terminal in contact with the central terminal of said identical cell. The cells and their terminals may thus be in accordance with GB 2270794A, or incorporate features of the cells or terminals of GB 2270794A. GB 2270794A is hence incorporated herein by reference.

BRIEF DESCRIPTION OF THE DRAWINGS

The invention will now be described by way of example with reference to the accompanying diagrammatic drawings.

In the drawings

FIG. 6 shows an enlarged plan view of one of the base plate components making up the base plate of the battery of FIG. 1.

DETAILED DESCRIPTION

Figure 1:
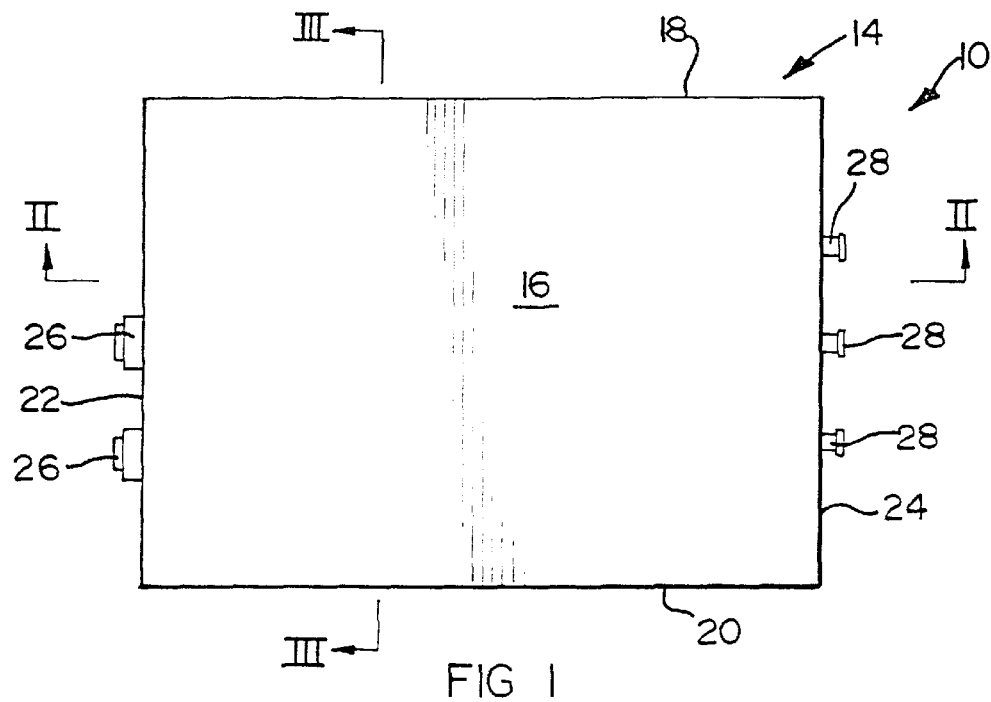
FIG. 1 shows a plan view of a high temperature storage battery according to the invention, with details omitted for clarity.

In the drawings, reference numeral 10 generally indicates a high temperature storage battery according to the invention.

The battery 10 comprises an inner battery box 12 and an outer battery box 14 surrounding the inner battery box. The outer battery box 14 is of laminar construction having a floor panel 15, a top panel 16, side panels 18, 20 and end panels 22, 24 which include, amongst others, heat insulating material 17 provided between double walls 19, 21 of the panels. The outer battery box 14 also includes battery terminals (not shown), a cooling air inlet manifold, with cooling air inlets 26 leading into the inlet manifold, and a cooling air outlet manifold, with spent cooling air outlets 28 leading from the outlet manifold. The inner battery box 12 comprises a floor panel 30 with side panels 32 and end panels 33 protruding upwardly from the floor panel.

The battery 10 is rectangular in plan view, as shown in FIG. 1, and the inner and outer battery boxes form a battery housing defining a cell storage cavity.

Inside the inner battery box 12, and located along the floor 30 from the one end panel to the other end panel, are provided a plurality of laterally spaced rails 34. On top of each rail 34 is located an elongate base plate component 36 of electrically insulative material such as mica. Each component 36 has a plurality of longitudinally spaced recesses 38 therein. The components 36 together make up a base plate 40 spaced by the rails 34 Prom the floor panel 30 such that a cooling air space 42 is provided between the base plate 40 and the floor panel 30. The space 42 is in communication, at the one end panel 22 of the outer battery box 14, with the air inlet manifold, and, at the other end panel 24 of the outer battery box, with the outlet air manifold. The space 42 is thus divided into channels by the rails 34, with a channel extending along the underside of each component 36.

Figure 2:
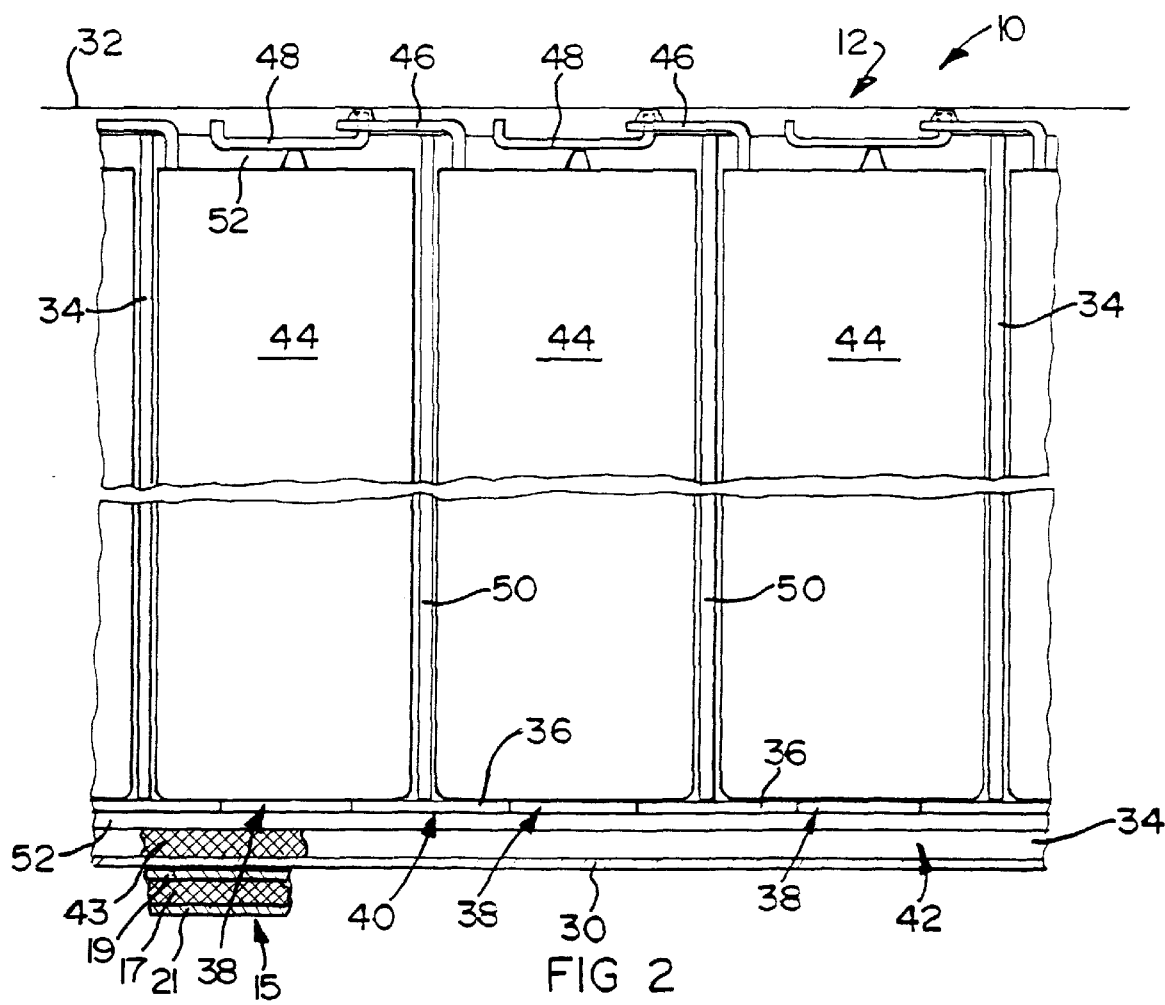
FIG. 2 shows, in part, an enlarged sectional view through II—II in FIG. 1, with details omitted for clarity and with the cells not being sectioned.
Figure 3:
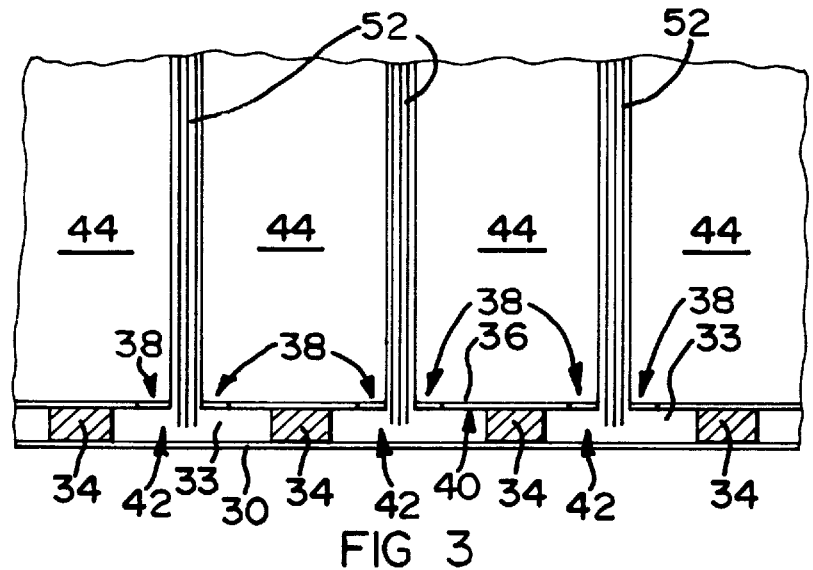
FIG. 3 shows, in part, a sectional view through III—III in FIG. 1, with details omitted for clarity and with the cells not being sectioned.
Figure 4:
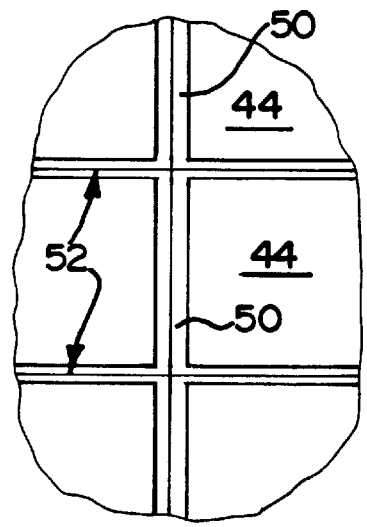
FIG. 4 shows a plan view of part of the battery of FIG. 1, with its top panel removed and the cells shown in outline only.
Figure 5:
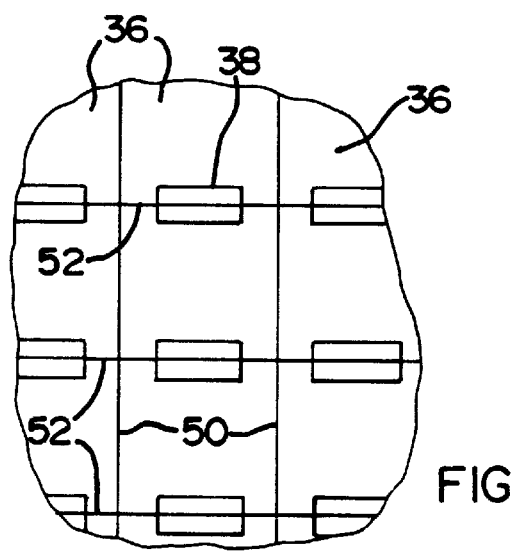
FIG. 5 shows a plan view of a part of the battery of FIG. 1, with top panel and cells removed.

Inside the inner battery box 12, ie in the cell storage cavity, are provided a plurality of non-aqueous high temperature electrochemical cells 44. The cells 44 are arranged in a plurality of adjacent rows, with the cells in adjacent rows being aligned with one another. Each row of cells is located on one of the base plate components 36. Each cell is of the kind comprising a molten sodium electrode or anode and a cathode comprising a sodium aluminum chloride electrolyte impregnated into an electronically conductive electrolyte permeable matrix in which is also dispersed iron or nickel as active cathode substance. The anode is separated from the cathode by a β"-alumina separator. The cells are square in cross-section, and electrode terminals 46, 48 protrude from the upper end of each cell. The terminals 46, 48 are connected together in series, as indicated most clearly in FIG. 2. The cells can thus be in accordance with GB 2270794A which is, as mentioned hereinbefore, incorporated herein by reference.

The cells 44 thus rest on the base plate 40, and a pair of the openings or apertures 38 are provided in the base plate 40 beneath each cell 44. Thus, each channel in the space 42 below the base plate 40 provides an enclosed reservoir for any cell reactants which should escape from the cells 44, eg on the cells being damaged, with the reactant then passing through the openings 38 into the reservoirs.

If desired, absorbent material 43 for released cell reactants may be located in the channels. This material may then be capable of reacting, eg to neutralize, any released reactants which enter the channels.

Adjacent cells in each row are separated from each other by means of electrically insulative mica panels or partitions 50. The panels 50 extend from the base plate 40 to above the upper ends of casings of the cells 44. The partitions 50 will thus serve to restrict movement of any released cell reactants in the event of cell failure. Typically, the panels 50 are about 0,5 mm thick.

The adjacent rows of cells are also separated from each other by means of insulating and supporting partitions 52. Each of these partitions has a laminar construction comprising an inner layer of stainless steel, nickel, ceramic, glass or other similar material capable of providing strength and rigidity to the partition, while the material of the outer layers is electrically insulative, such as mica. Typically, the outer layers are about 0,2 mm thick, while the inner layers can be about 0,1 mm thick. These partitions extend from below the base plate 40 to above the upper ends of the cell casings, and also serve to restrict movement of released cell reactants across the pack of cells in the cavity.

The safety features provided by the channels in the space 42, and the partitions between the cells, thus assist in preventing any released cell reactants from spreading throughout the cell storage cavity of the battery, which could lead to short-circuiting of groups of cells. Such short-circuiting would in turn result in high temperatures which could cause further release of cell reactants and eventually total battery failure.

These safety features thus eliminate, or at least reduce, propagation to total battery failure.

A prototype battery in accordance with the invention and incorporating these safety features, was made up. Under abuse test conditions, no flames or smoke emissions were observed, and total battery failure did not occur.

We claim:

1. A high temperature storage battery, which comprises
    a battery housing defining a cell storage cavity;

a plurality of non-aqueous high temperature electrochemical cells within the storage cavity;

a base below the plurality of cells; and a reservoir for released cell reactants in or below the base, with at least one access opening in the base through which reactants which are accidentally released from the cells can enter the reservoir, with the reservoir assisting in preventing any said released cell reactants from spreading throughout the cell storage cavity.

2. A high temperature storage battery, which comprises a battery housing defining a cell storage cavity, the battery housing being square or rectangular in plan view and being of laminar construction including an inner battery box providing the cell storage cavity, and comprising a floor panel, a pair of end panels and a pair of side panels, the end and side panels arranged peripherally around the floor panel and protruding upwardly therefrom; and a plurality of layers over and around the inner battery box and sealing off the inner battery box, these layers defining an outer battery box within which the inner battery box is located, with the outer battery box thus having complementary floor, side and end panels and also having a top panel closing off the upper end of the inner battery box, and with the floor, top and/or wall panels of the inner and/or the outer battery boxes being of double-walled construction with heat insulating material provided between the panel walls;

a plurality of non-aqueous high temperature electrochemical cells within the storage cavity;

a base below the cells; and a reservoir for released cell reactants in or below the base, with at least one access opening in the base through which reactants which are accidentally released from the cells can enter the reservoir.

3. A battery according to claim 2, wherein the base is integral with the inner battery box floor panel, with the reservoir being provided in the inner battery box floor panel.

4. A battery according to claim 2, wherein the inner battery box includes a base plate on which the cells are located, with the base plate being spaced from the inner battery box floor panel so that a cooling fluid space is provided between the base plate and the inner battery box floor panel, with the base plate and inner battery box floor panel thus constituting the base below the cells and the cooling fluid space constituting the reservoir for released cell reactants, and with the access opening(s) thus being provided in the base plate.

5. A battery according to claim 4, wherein the cells are arranged in a plurality of rows, with a plurality of the reservoirs, in the form of channels, being provided between the base plate and the inner battery box floor panel, with adjacent channels being isolated from each other and the channels running along the rows, and a plurality of the access openings being provided in the base plate along each channel.

6. A battery according to claim 5, wherein at least one opening is provided below each cell, and wherein absorbent material for released cell reactants, is located in the channels.

7. A battery according to claim 5, wherein the cells are arranged in groups, with spaces being provided between adjacent cells and/or between adjacent groups of cells and wherein, in addition to the lower cooling fluid space between the base plate and the inner battery box floor panel, an upper cooling fluid space is provided above the cells.

8. A battery according to claim 7, which includes an inlet manifold in communication with the lower cooling fluid space below the cells and a cooling fluid inlet leading into the inlet manifold, and an outlet manifold in communication with the upper cooling fluid space above the cells and a cooling fluid outlet leading from the outlet manifold, with the spaces between the cells or groups of cells interconnecting the upper and lower spaces and permitting cooling fluid movement from the lower to the upper space.

9. A battery according to claim 5, which includes electrical insulation material between at least some of the adjacent cells in each of the rows, with the insulation material protruding above the upper ends of cell casings of the cells to restrict movement of released cell reactants in the event of cell failure.

10. A battery according to claim 9, which includes electrically insulating and/or supporting partitions between adjacent rows of cells, with each partition being of laminar construction, and comprising an inner layer of material sandwiched between outer layers of material.

11. A battery according to claim 10, wherein the material of the inner layer of the partitions is selected from the group consisting in stainless steel, nickel, ceramic and glass, while the material of the outer layers is mica, with the partitions also extending to above the upper ends of the cell casings and/or protruding below the base plate, so that the partitions also serve to restrict movement of released cell reactants across the pack of cells in the cavity.

12. A high temperature storage battery, which comprises:

a battery housing defining a cell storage cavity;

a plurality of non-aqueous high temperature electrochemical cells within the storage cavity;

a base below the cells;

a reservoir for released cell reactants in or below the base, with at least one access opening in the base through which reactants which are accidentally released from the cells can enter the reservoir; and absorbent material for released cell reactants, in the reservoir.

13. A high temperature storage battery, which comprises:

a battery housing defining a cell storage cavity;

a plurality of non-aqueous high temperature electrochemical cells within the storage cavity;

a base below the cells; and a reservoir for released cell reactants in the base, with at least one access opening in the base through which reactants which are accidentally released from the cells can enter the reservoir.

14. A high temperature storage battery, which comprises:

a battery housing defining a cell storage cavity;

a plurality of non-aqueous high temperature electrochemical cells within the storage cavity;

a base below the cells;

a reservoir for released cell reactants in or below the base, with at least one access opening in the base through which reactants which are accidentally released from the cells can enter the reservoir; and electrical insulation material and/or partitions between at least some of adjacent said cells, and protruding above upper ends of cell casings of the cells to restrict movement of released cell reactants in the storage cavity in the event of cell failure.

\* \* \* \* \*